United States Patent [19]

Hirama

[11] Patent Number: 4,935,133
[45] Date of Patent: Jun. 19, 1990

[54] MAGNETIC TREATER

[75] Inventor: Yutaka Hirama, Ushiku, Japan

[73] Assignee: Hitachi Elevator Engineering & Service Co., Ltd., Tokyo, Japan

[21] Appl. No.: 187,465

[22] Filed: Apr. 28, 1988

[30] Foreign Application Priority Data

| | | |
|---|---|---|
| Apr. 30, 1987 [JP] | Japan | 62-104641 |
| May 14, 1987 [JP] | Japan | 62-116008 |
| Jan. 21, 1988 [JP] | Japan | 63-9733 |
| Jan. 21, 1988 [JP] | Japan | 63-9734 |

[51] Int. Cl.⁵ .......................................... C02F 1/48
[52] U.S. Cl. ............................. 210/222; 210/223
[58] Field of Search ............... 210/94, 95, 222, 223, 210/695; 123/536, 537, 538, 539; 55/100; 184/6.25

[56] References Cited

U.S. PATENT DOCUMENTS

| | | | |
|---|---|---|---|
| 290,000 | 12/1883 | Detrick | 210/95 |
| 3,228,878 | 1/1966 | Moody | 210/695 |
| 3,762,135 | 10/1973 | Ikebe et al. | 55/100 |
| 4,390,423 | 6/1983 | Sundt | 210/222 |

FOREIGN PATENT DOCUMENTS

| | | |
|---|---|---|
| 0089200 | of 0000 | European Pat. Off. |
| 878258 | 1/1942 | France .................. 210/222 |
| 154188 | of 1984 | Japan . |
| 33290 | of 1986 | Japan . |
| 675369 | of 0000 | United Kingdom . |
| 1329907 | of 0000 | United Kingdom . |
| 2109709 | of 0000 | United Kingdom . |
| 8101112 | of 0000 | World Int. Prop. O. . |
| 8404294 | of 0000 | World Int. Prop. O. . |

Primary Examiner—W. Gary Jones
Assistant Examiner—Matthew O. Savage
Attorney, Agent, or Firm—Oblon, Spivak, McClelland, Maier & Neustadt

[57] ABSTRACT

Disclosed herein is a magnetic treated suitable for arrangement in a flow path of a fluid so as to introduce the fluid into a magnetic field to perform its magnetic treatment. The magnetic treater includes a magnetically-acting member having at least two magnetically-acting surfaces magnetized in opposite polarities and maintained opposite to each other at a predetermined interval via an interval-limiting means, a fluid inlet, a fluid outlet, and a casing. The casing is provided with the fluid inlet and fluid outlet and encloses the magnetically-acting member in such a way that at least spacing between the magnetically-acting surfaces is in communication with the fluid inlet and fluid outlet and serves as a flow passage for the fluid. As the magnetically-acting member, stacked permanent magnets or a combination of a permanent magnet and magnetic pole plates connected to and magnetized by the permanent magnet may be chosen.

11 Claims, 12 Drawing Sheets

MAGNETIC TREATER

BACKGROUND OF THE INVENTION (1) Field of the Invention:

This invention relates to a magnetic treater useful in magnetically achieving improvements in the quality of water, the clarification of water, and improvements in the quality of ready-mixed concrete or the like.

(2) Description of the Prior Art:

Red rust in water supply facilities such as piping and water storage tanks, so-called transferred rust brought in from the outside, and similar rust may be mixed even in the drinking water of a water works. Where the rust so mixed is in the form of minute particles of red rust in particular, the rust particles do not settle readily but remain in a suspended state in the water. Water which contains such red rust particles in a suspended state is called "red water", because it has a red color due to the inclusion of the particles. Red water is not good for drinking. Its clarification has therefore been attempted, for example, by using chemical methods, mechanical methods such as filtration, or biological methods.

However it is difficult in fact to use a chemical method because the thus-treated water may pose a potential danger to human beings, animals or plants. A mechanical method results in a higher equipment investment as the quantity of water to be treated increases. Accordingly, these methods have not been used in practice for actual water supply facilities. On the other hand, no feasible biological method for purifying water has been established yet and it is therefore not expected to be adopted at this stage. Under the circumstances, there is high interest these days in the exposure of water to a magnetic field for its treatment, namely, in magnetic treatment.

Magnetically-treated water is known to be effective, for example, in preventing the occurrence of red rust in drinking water or on the inner wall of piping and also removing it therefrom, promoting the growth of plants, promoting the settling of suspended solid particles, improving the strength of concrete and improving the fuel consumption of liquid fuel. A variety of apparatus have been developed for performing such magnetic treatments.

One such apparatus which may be mentioned is the water treater disclosed in Japanese Patent Laid-Open No. 154188/1984. The water treater has the following construction. Within a cylindrical space defined by inner and outer jackets made of a non-magnetic material, a plurality of annular permanent magnets magnetized in opposite poles at the inner and outer peripheral walls thereof respectively are stored via collars made of a non-magnetic material with one of the poles of each magnet being located adjacent to the opposite pole of the next magnet. A central member made of a ferromagnetic material and having an outer diameter smaller than the inner diameter of the inner jacket is inserted centrally through the inner jacket, whereby an inner flow passage is defined between the central member and inner jacket. An outer tube made of a ferromagnetic material and having an inner diameter greater than the outer diameter of the outer jacket is coaxially applied over the outer jacket so that an outer flow passage is defined between the outer tube and outer jacket. Water to be treated is caused to flow through the inner and outer flow passages.

The water treater is described to have such effects that owing to the above construction, lines of magnetic flux produced from each of the annular permanent magnets are allowed to extend across the inner and outer flow passages so as to expose the water, which is flowing through the inner and outer flow passages for its treatment, to as much a magnetic field as possible.

Another known example is a drinking water treater disclosed in Japanese Patent Laid-Open No. 33290/1986. The drinking water treater has the following construction. A plurality of axially-magnetized annular permanent magnets are arranged in a contiguous relation within a hollow cylinder in such a way that they are coaxial with one another, they are in mutual contact at poles of the same type, and their central openings form a flow passage through which drinking water may be caused to flow. The drinking water treater is described to have the following advantageous effects. Owing to the construction described above, magnetic fields are compressed by one another so that the density of each magnetic flux perpendicular to the flow can take the maximum value. Since a fluid passes inside the annular permanent magnets, the magnetic flux does not spread there so that the inside serves as a space having an effective flux density throughout. As a result, the activation of the fluid can be performed effectively, thereby exhibiting a quality-improving function without growth of bacteria.

As a further example, there is a water treater in which water to be treated is caused to flow for its magnetic treatment through a cylindrical flow passage defined between an inner tube connected to one of the opposite poles of a permanent magnet and an outer tube connected to the other pole of the permanent magnet and surrounding the outer peripheral wall of the inner tube. In this water treater, the inner and outer tubes are rendered closer to each other on the side of one end of the flow passage so that a constricted part is formed. A magnetic flux of high density is produced at the constricted part, whereby water under treatment is subjected to a magnetic treatment when it passes through the constricted part.

Incidentally, it has been substantiated empirically that the flux density required for a magnetic treatment varies depending on the application field and purpose. A magnetic treatment at a flux density of from 1,000 to 1,500 gauss has been recognized to be effective for the promotion of growth of plants including fungi. On the other hand, a magnetic treatment at a flux density of at least 5,000 gauss has been found to be effective for the removal of red rust and scale.

In the first-mentioned water treater, lines of magnetic flux are produced between a permanent magnet having an inner N pole and an outer S pole and its axially-adjacent permanent magnet having an inner S pole and an outer N pole, and the lines of magnetic flux are allowed to traverse across the entire annular cross-sections of the inner and outer flow passages. The distance between the opposite poles, however, becomes longer so that the flux density is lowered. Thus, it is only possible to obtain magnetic densities as low as about 2,000 gauss even at the highest. Although the magnetic density becomes higher in general as the cross-sectional area of a flow passage decreases, this solution is accompanied by the disadvantage that it cannot provide any necessary treatment capacity.

In the second-mentioned drinking water treater, the permanent magnets are arranged in a contiguous relation with their magnetic poles of the same polarity being in contact, thereby making use of repulsive magnetic fields. Compressed opposite magnetic fields hence exist side by side but the resulting flux densities are low. The second-mentioned drinking water treater is therefore not effective for the removal of red rust and scale. The magnetic fields are also reduced in intensity due to the repulsion, thereby making the water treater unsuitable for use over a long period of time.

In the third-mentioned water treater, on the other hand, water is magnetically treated upon its passage through the constricted part. This magnetic treatment is, however, so momentary that the magnetic treatment is not believed to be applied to its full advantage. In addition, the area of the flow passage is reduced at the constricted part and the flow passage resistance becomes greater there. This has led to another problem, namely, that the water treater can hardly achieve any desired flow rate.

SUMMARY OF THE INVENTION

An object of this invention is therefore to provide a magnetic treater which can provide a high flux density of at least 5,000 gauss, preferably, at least 7,000 gauss.

Another object of this invention is to provide a magnetic treater which permits efficient magnetic treatment of a great deal of fluid without the need for reducing the area of a flow passage.

A further object of this invention is to provide a magnetic treater which can remove not only red rust in water under treatment but also scale and red rust stuck on the inner wall of piping.

A still further object of this invention is to provide a magnetic treater which permits easy selection of a suitable flux density depending on the application purpose.

A final object of this invention is to provide a magnetic treater which can exhibit a prescribed performance over a long period of time and with high reliability.

In one aspect of this invention, there is thus provided a magnetic treater suitable for arrangement in a flow path of a fluid so as to introduce the fluid into a magnetic field to perform its magnetic treatment, comprising:

a magnetically-acting member having at least two magnetically-acting surfaces magnetized in opposite polarities and maintained opposite to each other at a predetermined interval via an interval-limiting means;

a fluid inlet;

a fluid outlet; and a casing provided with the fluid inlet and fluid outlet and enclosing the magnetically-acting member in such a way that at least the spacing between the magnetically-acting surfaces is in communication with the fluid inlet and fluid outlet and serves as a flow passage for the fluid.

In the above magnetic treater, the magnetically-acting member is formed by arranging the magnetically-acting surfaces side by side via the interval-limiting means so that they have opposite polarities. The magnetically-acting member is enclosed within the casing. The fluid which has been introduced from the fluid inlet is allowed to flow through the spacing formed as a flow passage between the magnetically-acting surfaces. As a result, the fluid is subjected to a magnetic treatment while it passes through the spacing and the magnetically-treated fluid is then discharged from the fluid outlet.

Here, the interval between the magnetically-acting surfaces, namely, the width of the flow passage, may be set by the interval-limiting means at such a value that no clogging would occur. The setting of the width of the flow passage may be effected depending on the viscosity of a fluid to be treated or the size or particle diameter of dust or the like contained in the fluid. Even if the interval between the magnetically-acting surfaces becomes wider, the fluid is exposed to magnetism over the entire range of its passage between the magnetically-acting surfaces arranged opposite to each other so that the magnetic treatment is applied for a longer period of time. Accordingly, the magnetic treatment of the fluid can be effected fully.

DESCRIPTION OF THE PREFERRED EMBODIMENTS

[First Embodiment]

Figure 1:
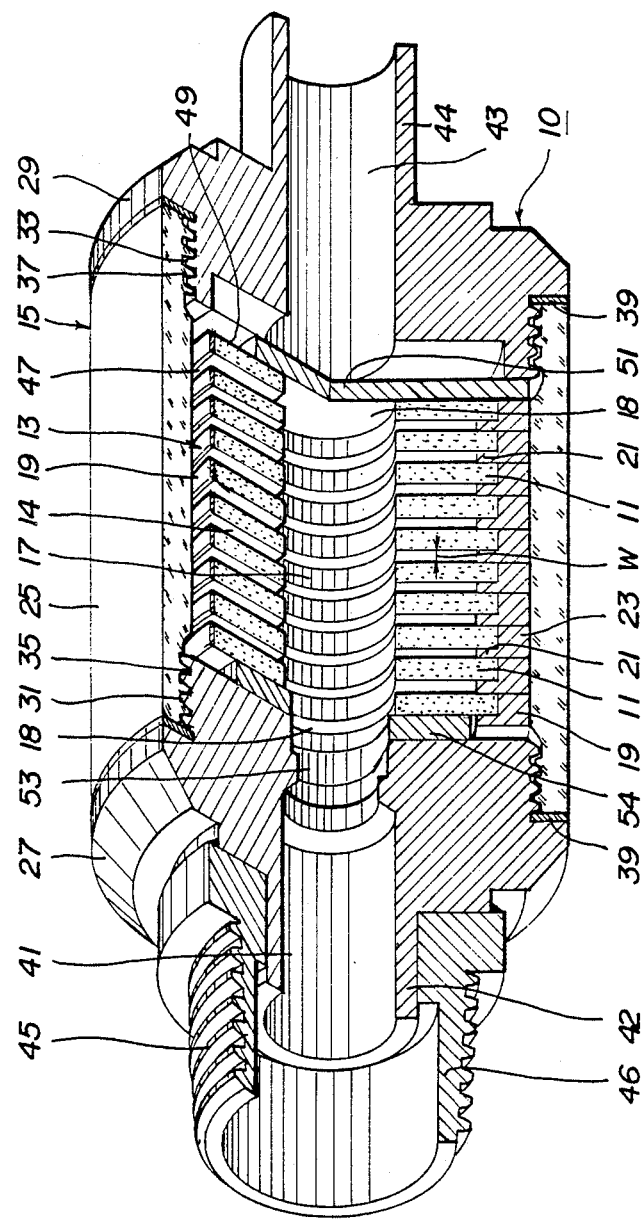
FIG. 1 is a partly cut-away perspective view of a magnetic treater according to a first embodiment of this invention.
Figure 2:
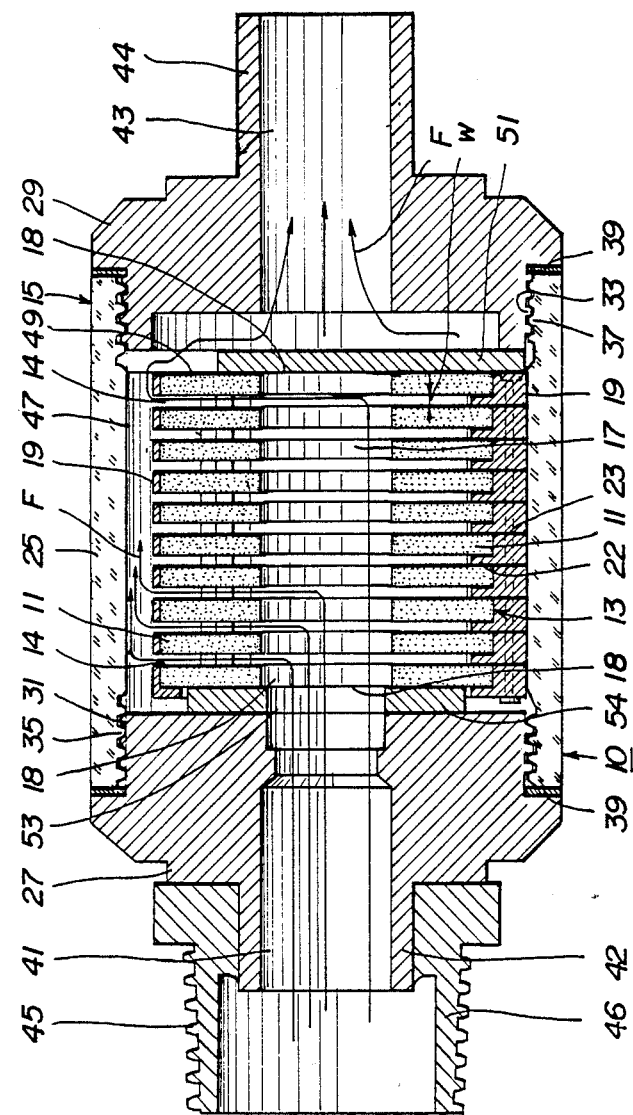
FIG. 2 is a vertical cross-section of the magnetic treater.

In FIGS. 1 and 2, the magnetic treater according to the first embodiment is designated generally at numeral 10. The magnetic treater 10 is constructed mainly of a train of permanent magnets and a casing 15 enclosing the train of permanent magnets therein. The train of permanent magnets will hereinafter be referred to as "permanent magnet train" and will be identified by numeral 13. The permanent magnet train 13 is composed of a stacked unit of plural permanent magnets 11.

Figure 3:
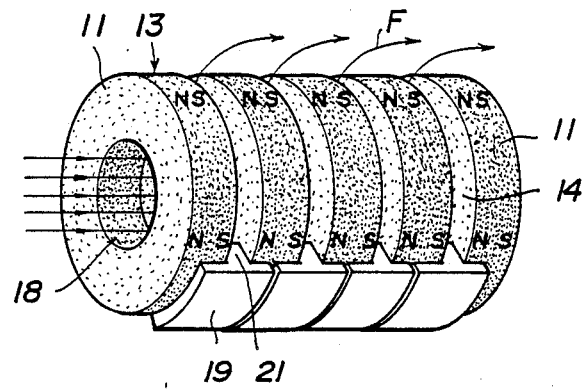
FIG. 3 is a schematic illustration showing the flow of water under treatment by the magnetic treater and the arrangement of magnetic poles magnetized.

The permanent magnets 11 are annular disks and define a through-hole 17 centrally. As illustrated in FIG. 3, both sides of each permanent magnet 11 are magnetized respectively in N pole and S pole which serve as magnetically-acting surfaces. The permanent magnets 11 are samarium-cobalt magnets and have been magnetized at 10,800 gauss in terms of energy product. As illustrated in FIGS. 1 and 2, ten permanent magnets of the above-described type are stacked together in such a way that their through-holes 17 are aligned axially and each of the permanent magnets and its adjacent permanent magnet are arranged with opposite magnetic poles facing each other, whereby the permanent magnet train 13 as a magnetically-acting member is formed. The stacked unit has been formed by stacking the permanent magnets 11 with holders 19 being interposed therebetween. The holders 19 are fitted on outer peripheral portions of the individual permanent magnets 11 and are made, for example, of a polycarbonate. Each of the holders 19 has a ring-like configuration and has, as integral parts thereof, spacer portions 21 extending radially and inwardly as interval-limiting means at three locations and projections extending radially and outwardly as means for forming a flow passage for treated water. It is therefore possible to choose the interval W between the adjacent permanent magnets 11 as desired by changing the thickness of the spacer portions 21. In the first embodiment, the interval W is set at 1.5 mm in view of the flux density and the area of the flow passage. Although the interval W may be from 1 mm to 2 mm optimally, an interval of from 0.5 mm to 5 mm may be chosen in general. An interval smaller than 0.5 mm is certainly advantageous from the standpoint of magnetic density. Such a small interval is however impractical, because the permanent magnets 11 are attracted to one another so much that their assembly is technically difficult and in addition, clogging may take place due to dust, rust and the like contained in water to be treated.

The permanent magnet train 13 formed in the above-described manner, namely, by stacking the permanent magnets 11 while interposing the holders 19 therebetween may be handled as an integral unit without need for a separate fixing means owing to the mutual attracting forces of the individual permanent magnets. If necessary, a through-hole may however be formed through each of the projections 23 so as to fix the holders 19 by a bolt and a nut.

The casing 15 is formed of a cylindrical cover pipe 25, a flange 27 located on the inlet side of water to be treated, and another flange 29 located on the outlet side of treated water. Threaded portions 35,37 formed in the inner peripheral wall of the cover pipe 25 are brought into engagement with threaded portions 31,33 formed in the outer peripheral walls of the flanges 27,29 respectively, whereby the cover pipe 25 and the flanges 27,29 are assembled into an integral unit. Upon assembly, a packing 39 is interposed between each end wall of the cover pipe 25 and the end wall of the corresponding flange so that the casing 15 has a water-tight structure.

Through the flange 27 located on the inlet side of water to be treated, an inlet passage 41 for introducing the water from the outside into the casing is formed as a fluid inlet in such a way that the central axis of the inlet passage 41 is coincided with a channel 18 defined by the through-holes 17 arranged in series. Through the flange 29 located on the outlet side of treated water, an outlet passage 43 for guiding out the treated water is formed as a fluid outlet in such a way that the central axis of the outlet passage 43 is coincided with the channel 18. These flanges 27,29 are both made of soft magnetic iron. If necessary, a coupler 46 with a pipe-receiving thread 45 formed therein may be welded on the outer peripheral wall of a passage portion 42 extending out from the flange 27. In this case, the flange 27 is connected to a water path outside the magnetic treater 10 by way of the coupler 46. Needless to say, a similar coupler may also be applied to the outer peripheral wall of a passage portion 44 of the flange 29 if necessary.

The cover pipe 25 is formed of a transparent polycarbonate in the illustrated embodiment. Its internal diameter has been set at a value sufficient to permit the fitting of the projections 23 of the holders 19. When the permanent magnet train 13 is inserted into the casing 15, a flow passage 47 for treated water is therefore formed between the inner wall of the cover pipe 25 and the outer peripheral portions of the holders 19 other than the projections 23. It is also possible to visually inspect, from the outside, spacings 14 between the permanent magnets 11 and the flow passage 47 for treated water, since the cover pipe 25 is transparent.

Over an end surface 49 of the permanent magnet train 13, said end face 49 being located on the side of the outlet-side flange 29, a blind patch 51 made of soft magnetic iron is provided as a flow-limiting means so that the channel 18 is closed up there. The blind patch 51 is formed in such a shape that it closes up only the channel 18 but does not block the flow passage 47 for treated water. In the illustrated embodiment, the blind patch 51 extends radially and outwardly at locations corresponding to the projections 23 of the holders 19 so that the end face of the outlet-side flange 29 is maintained in contact with the radially-and outwardly-extended portions of the blind patch 51 to hold the blind patch 51 in place. As an alternative, a through-hole may be formed through one of the radially- and outwardly-extended portions of the blind patch 51 at a point corresponding to the throughholes formed through the projections 23 of the holders 19, and the blind plate 51 may be fixed as a unitary member along with the holders 19 on the permanent magnet train 13 by a bolt and nut.

A disk-shaped spacer 54 made of soft magnetic iron and defining a through-hole 53 having the same diameter as the channel 18, said through-hole 53 being coincident with the channel 18, is provided with the permanent magnet train 13 o the side of the inlet-side flange 27. Accordingly, the permanent magnet train 13 is held inside the casing 15 in such a state that the spacer 54 is arranged on the side of the inlet passage 41 and the blind plate 51 is located on the side of the outlet passage 43. As a consequence, the magnetic treater defines a flow passage which extends from the inlet passage 41, through the through-hole 53 of the spacer 54 and through the channel 18, to the spacings 14 between the individual permanent magnets 11 and to the flow passage 47 for treated water, and further to the outlet passage 43.

Figure 4:
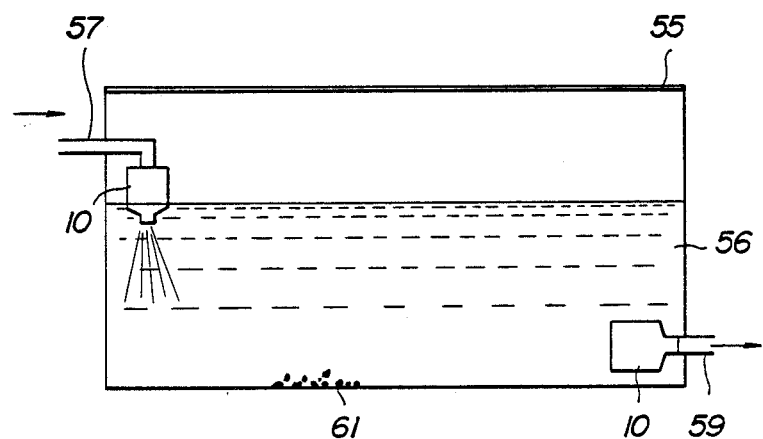
FIG. 4 is a schematic illustration depicting the manner of use of the magnetic treater.

The magnetic treater 10 may be used as shown by way of example in FIG. 4. Namely, two magnetic treaters of the same type as the magnetic treater 10 may be threadedly connected, via their corresponding couplers of the same type as the coupler 46 described above; one to the discharge end of a water supply pipe 57, and the other to the suction end of a distributing water pipe 59 in a water storage tank 55 of a building. In the exemplified application, the magnetic treater 10 provided on the side of the water supply pipe 57 serves mainly to remove rust from the city water to be transferred from a water main, while the magnetic treater 10 provided on the side of the distributing water pipe 59 is employed to remove red rust from city water to be distributed from the water storage tank 55 to various locations in the building and also to remove red rust from the inner wall of the distributing water pipe.

The function of the magnetic treaters 10 will next be described in detail.

When city water with red rust mixed therein is supplied from the water main to the water storage tank 55 via the water supply pipe 57, the city water is guided through the inlet passage 41 of the flange 27 to the channel 18 of the permanent magnet train 11. Since the channel 18 is closed up by the blind plate 51 provided on the side of the outlet-side flange 29, the thus-introduced city water flows out in its entirety through the spacings 14 between the individual permanent magnets 11 toward the outer peripheries of the permanent magnets 11. Since the opposing faces of each adjacent permanent magnet 11 are magnetized in opposite magnetic poles, the city water is exposed to a magnetic flux having a density of at least 5,000 gauss, mostly 6,000–7,000 gauss while it passes through the spacings 14. The spacings 14 hence function as passages for magnetic treatment, wherein the magnetic treatment of the city water is performed.

The magnetically-treated city water then reaches the flow passage 47 for treated water, which is formed between the outer peripheral portions of the holders 19 fitted over the outer peripheries of the permanent magnets 11 and the inner wall of the cover pipe 25. The treated water then flows out in the axial direction along the inner wall of the cover pipe 25. The treated water passes outside the outer peripheral surface of the blind plate 51 and gathers in the outlet passage 43. It is then discharged from the outlet passage 43 into the water storage tank 55. Water streams within the magnetic treater 10 at this stage are indicated by arrows F in FIGS. 2 and 3.

In the magnetically-treated city water, red rust mixed therein has been reduced into black rust particles 61. The magnetized black rust particles 61 agglomerate and precipitate in water 56 stored in the water storage tank 55. Therefore, the city water is supplied as extremely transparent water through the distributing water pipe 59 to the various locations in the building. Described more specifically, the principal substance of red rust is believed to be ferric oxide, $Fe_2O_3$. Ferric oxide then seems to be reduced into $Fe_3O_4$ and FeO. Each of these $Fe_3O_4$ and FeO is black rust. The valency of the iron has hence been reduced from III to II. Although no ferromagnetic substance is contained in red rust, ferromagnetic materials are contained at substantial levels in the black rust. Upon magnetization of the black rust, they agglomerate and precipitate so that the production of red water is suppressed. Incidentally, the black rust thus agglomerated and precipitated may be removed by using a separate permanent magnet or the like at the time of building maintenance which may be performed, for example, once a month.

On the other hand, the magnetic treater 10 provided on the side of the distributing water pipe 59 subjects the magnetically-treated water, which is stored in the water storage tank 55, to additional magnetic treatment. Owing to the additional magnetic treatment, it is possible to remove red rust accumulated on the inner wall of the piping extending to each location where water is used. This seems to take place in such a way that the red rust on the inner wall of the piping is probably reduced by nascent-state hydrogen in the magnetically-treated city water, the surface of the red rust is converted gradually into black rust, and the black rust is then separated and washed away.

The attachment of the magnetic treater 10 to the discharge end of the water supply pipe 57 and also to the suction end of the distributing water pipe 59 can therefore achieve not only the prevention of red water but also the removal of red rust from the piping in the building.

Figure 6:
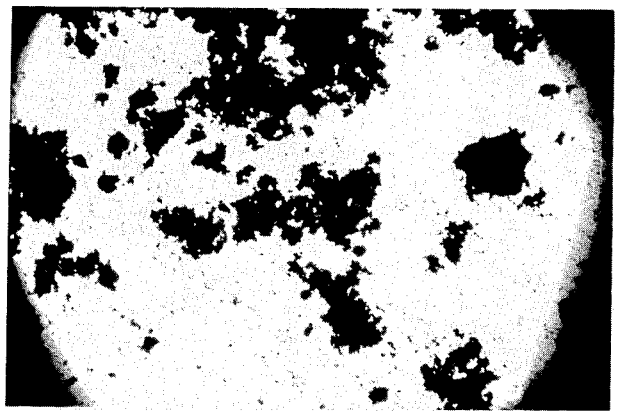
FIG. 6 is a photomicrograph showing the state of particles in water to be treated magnetically.
Figure 7:
FIG. 7 is a photomicrograph illustrating the precipitated state of particles in water which has been treated magnetically.

The state of conversion of red rust into black rust and that of agglomeration of the black rust are shown in FIGS. 6 and 7 respectively. In the example corresponding to these figures, red water was prepared by mixing about 7 g of red rust powder in 20 l of city water and was then forced to circulate through the magnetic treater 10 by means of a pump. FIG. 6 is a photomicrograph showing the initial structure of the particles mixed. The minute particles which look like dots are the red rust powder having a particle size of about 1 $\mu$m. FIG. 7 is a photomicrograph depicting the structure of particles contained in the city water on the third day after the initiation of the treatment. The red rust powder has been converted into agglomerates of black rust having a size of at least 1,000 $\mu$m per agglomerate. Even when the treated city water was stirred, most crystals remained precipitated and the treated city water did not become reddish.

Since the provision of the magnetic treater according to the first embodiment with the water storage tank 55 of the building allows the application of magnetic treatment to city water, and owing to its strong magnetizing effects as described above, the prevention of red water and the removal of red rust can be achieved.

Description has been made of the removal of red rust in the above embodiment. It is also possible to remove hardly-soluble scale adhered on the inner wall of piping. In this case, the hardly-soluble scale is reduced gradually into soluble scale. This soluble scale is then dissolved into the city water and thus washed away.

Figure 5:
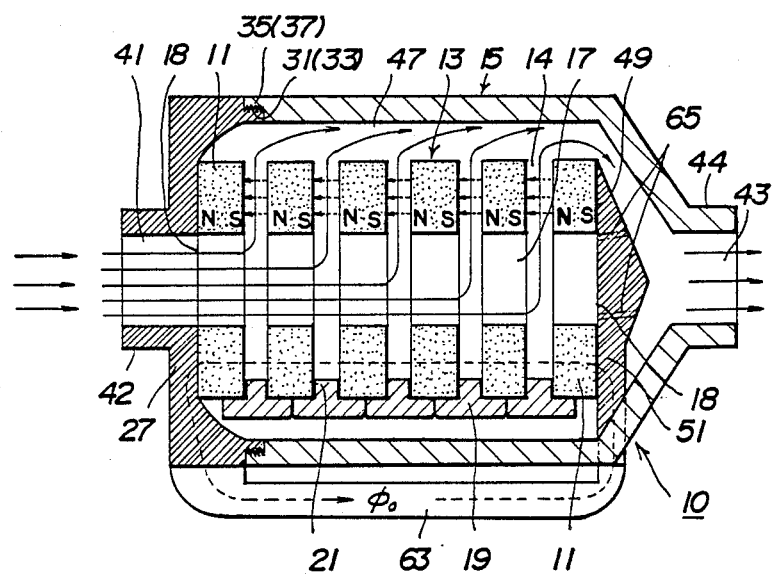
FIG. 5 is a schematic fragmentary illustration of a magnetic treater according to a second embodiment of this invention, in which both outer magnetic poles of a train of permanent magnets are short-circuited.

In the above embodiment, the flow-limiting means is composed of the blind plate 51, and water introduced for treatment is guided into the spacings 14 between the permanent magnets 11, whereby the water is magnetically treated in the spacing 14. Where it is not required to use a flux of high density for magnetization, some of the water may be discharged directly to the side of the outlet passage 43 through the flow-limiting means. In this case, it is effective to form orifices 65 at positions distributed along the inner wall of the through-hole 17 of the adjacent permanent magnet 11 as illustrated in FIG. 5, so that the water is partly allowed to flow out through the orifices 65.

As has been described above, the magnetic treater according to the first embodiment has brought about various advantages which will be described below.

(1) Many annular disk-shaped permanent magnets 11 magnetized at both sides thereof are stacked together at small intervals via the spacer portions 21 of the holders 19 in such a way that each magnetic pole of each of the permanent magnets 11 opposes the opposite magnetic pole of an adjacent permanent magnet 11. It is hence possible to obtain a flux density of 6,000–7,000 gauss in the spacing 14, as the magnetically-acting passages, by the permanent magnets 11 having an energy product of about 10,800 gauss.

(2) Since a flux density higher than 5,000 gauss can be obtained as mentioned above in advantage (1), the magnetic treater can exhibit strong magnetizing action so that the occurrence of red water can be avoided easily.

(3) For the same reasons as mentioned in advantage (2), it is also possible to achieve effective removal of red rust and scale from the inner wall of piping.

(4) The total flow passage area of the spacings 14 between the adjacent permanent magnets 11 can be rendered equal to the area of the channel 17 by adjusting the width of the spacings 14 and the number of the permanent magnets 11, so that a great deal of water can be magnetically treated without increasing the flow passage resistance.

(5) Since the interval W between the permanent magnets 11 can be set freely depending on the thickness of the spacer portions of the holders 19, it is possible to obtain, for example, a flux density of about 1,500 gauss, which is said to be suitable for the growth of plants, by a similar structure. There is hence no limitation to the applicable field of magnetic treatment.

(6) The cover pipe 25 is made transparent, so that the magnetic treater can be cleaned up before the spacings 14 are clogged.

(7) Since water is magnetically treated while it flows out toward the outer peripheries of the permanent magnets 11, the water is exposed to a magnetic field for a longer period of time, and full magnetic treatment is achieved.

(8) Each holder 19 fitted over the outer peripheral portions of its corresponding permanent magnet 11 is provided integrally with the spacer portions 21 as an interval-limiting means and projections 23 as a means for forming flow passage for treated water. The assembly of the magnetically-acting member is therefore easy.

Magnetically-treated water has already been known to have settling-promoting effects for suspended fine solid particles, strength-improving effects for concrete, fuel consumption improving effects for liquid fuel, etc., in addition to the above-mentioned prevention and removal of red rust and scale, and growth promoting effects for plants. Needless to say, the magnetic treater according to the first embodiment can exhibit all the above effects. In particular, the magnetic treater can also show sufficient effects for objects for which such magnetic treatment has been considered to be little effective due to the lack of a magnetic treater capable of producing a flux density of 5,000 gauss or higher.

[Second Embodiments]

In the first embodiment described above, the ten permanent magnets 11 are stacked together into the permanent magnet train 13 so that a high flux density is obtained. Where the number of stacked permanent magnets is small, the inlet-side flange 27 which acts as the N pole piece, and the blind plate 51 which acts as the S pole piece in contact with both end faces of the permanent magnet train 13 respectively may however be short-circuited by a yoke 63 to form a closed magnetic circuit. As a result, the flux density in the spacings 14 defined as magnetically-acting passages between the adjacent permanent magnets 11 can be increased. The magnetic treater according to the second embodiment can therefore exhibit effects similar to those mentioned above with respect to the first embodiment.

In FIG. 4, elements of structure which can be considered equal to their corresponding elements in FIGS. 1 and 2 are identified by like reference numerals and their detailed description is hence omitted herein.

[Third Embodiment]

Figure 8:
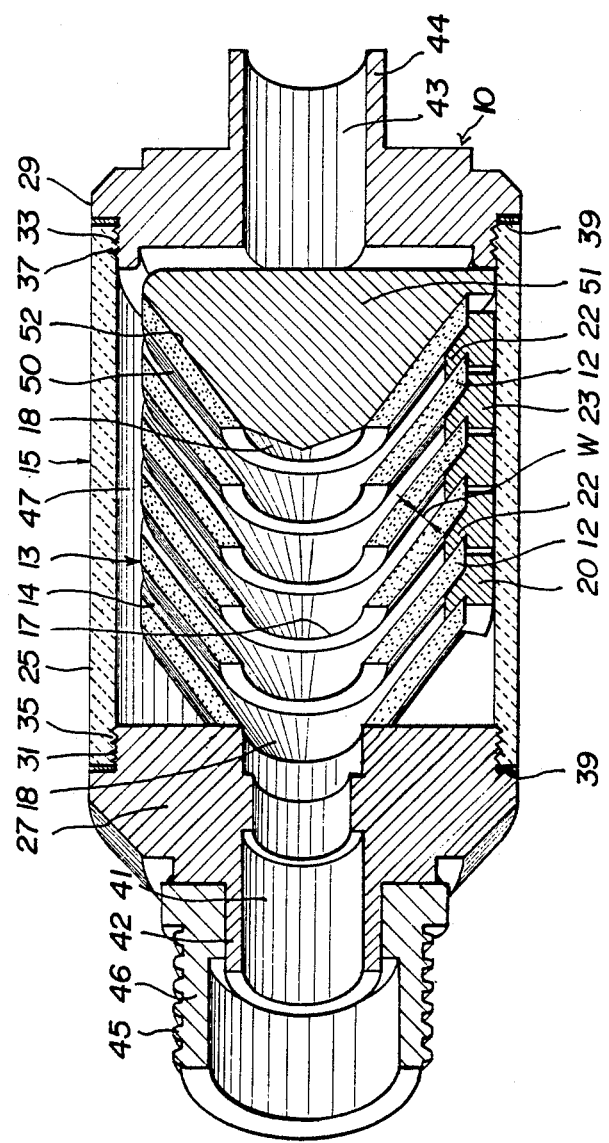
FIG. 8 is a partly cut-away perspective view of a magnetic treater according to a third embodiment of this invention.
Figure 9:
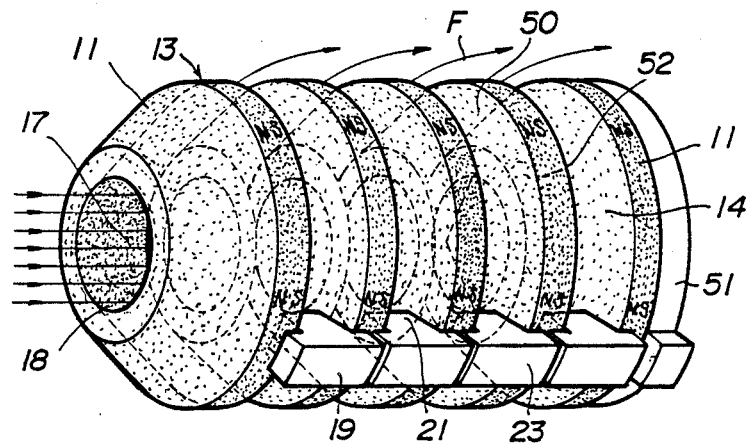
FIG. 9 is a schematic illustration showing a train of permanent magnets in the magnetic treater of FIG. 8.
Figure 10:
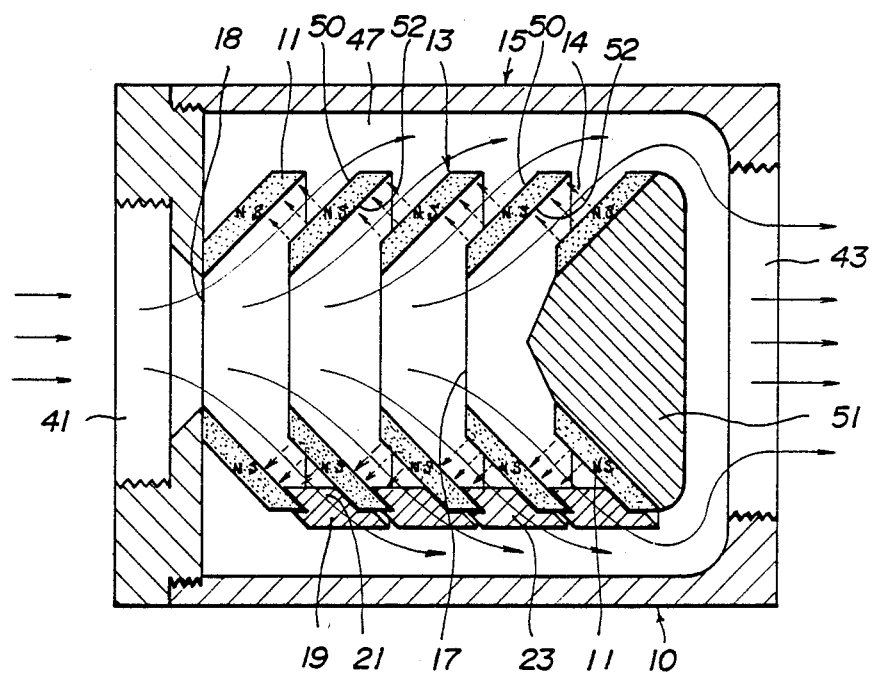
FIG. 10 is a schematic illustration showing the flow of water under treatment by the magnetic treater of FIG. 8 and the arrangement of magnetic poles magnetized.

FIGS. 8–10 illustrate the magnetic treater according to the third embodiment of this invention. The third embodiment is a modification of the first embodiment. The third embodiment is different only in the shapes of permanent magnets 12 and holders 20 which make up a permanent magnet train 13; the other elements are formed either identical or similar to the corresponding elements of the first embodiment.

In the third embodiment, each permanent magnet 12 is a cylinder having a shape similar to a conical cylinder with its head portion cut off, namely, a so-called truncated conical cylinder. It centrally defines a through-hole 17 and as shown in FIGS. 9 and 10, its outer peripheral surface 50 and inner peripheral surface 52 are magnetized in N and S poles respectively. The permanent magnet 12 is a samarium-cobalt magnet and has been magnetized to 10,800 gauss in terms of energy product. As shown in FIG. 8, the six permanent magnets 12 are stacked together in such a way that their through-holes 17 are aligned axially and each of the permanent magnets and its adjacent permanent magnet are arranged with opposite magnetic poles facing each other, whereby the permanent magnet train 13 is formed. In the thus-stacked unit, the individual permanent magnets 12 are stacked via holders 20 which are made of a polycarbonate by way of example and are fitted onto the outer peripheral portions of the individual permanent magnets 12. Each of the holders 20 has a cylindrical configuration and has, as integral parts thereof, spacer portions 22 extending radially and inwardly at an angle as interval-limiting means at three locations spaced apart with angular intervals and projections 23, extending radially and outwardly as means for forming a flow passage for treated water. It is therefore possible to choose the interval W between the adjacent permanent magnets 11 as desired by changing the thickness of the spacer portions 22. In the third embodiment, the interval W is set at 3.0 mm in view of the flux density and the area of the flow passage.

Since FIGS. 8, 9 and 10 correspond to FIGS. 1, 3 and 4 respectively, elements of structure which can be considered equal to their corresponding elements in FIGS. 1, 3 and 4 are identified by like reference numerals and their detailed description is hence omitted herein.

The magnetic treater according to the third embodiment functions like the first embodiment and exhibits similar effects. Since the spacings 14 defined as flow passages between the adjacent permanent magnets 12 extend at an acute angle relative to the direction of flow of a fluid from the inlet passage 41, the flow passage resistance is reduced so that the fluid of a large volume can be subjected to efficient magnetic treatment. This indicates that the third embodiment is more advantageous than the first embodiment, especially, when a high-viscosity fluid is treated magnetically. As in the second embodiment, a closed magnetic circuit can also be formed in the third embodiment.

[Fourth Embodiment]

Figure 11:
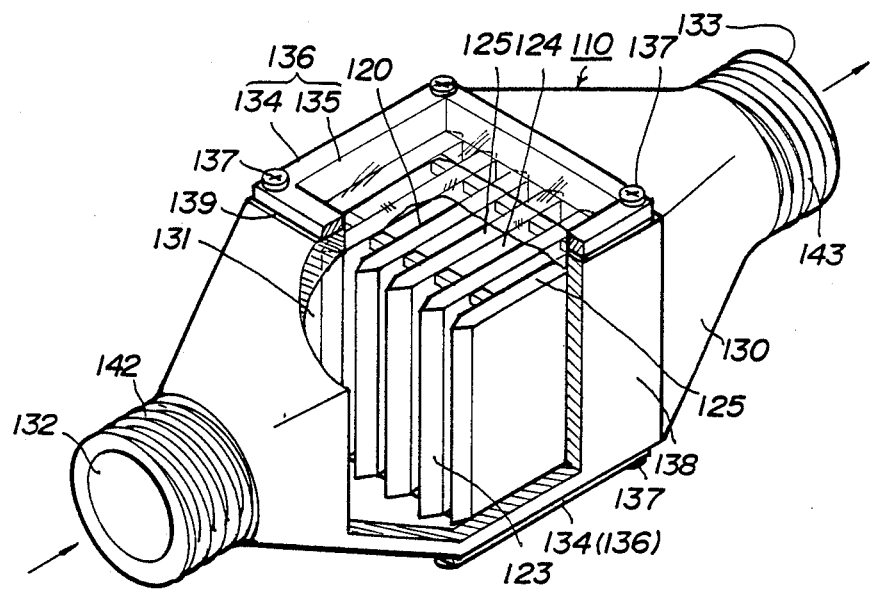
FIG. 11 is a partly cut-away perspective view of a magnetic treater according to a fourth embodiment of this invention.
Figure 12:
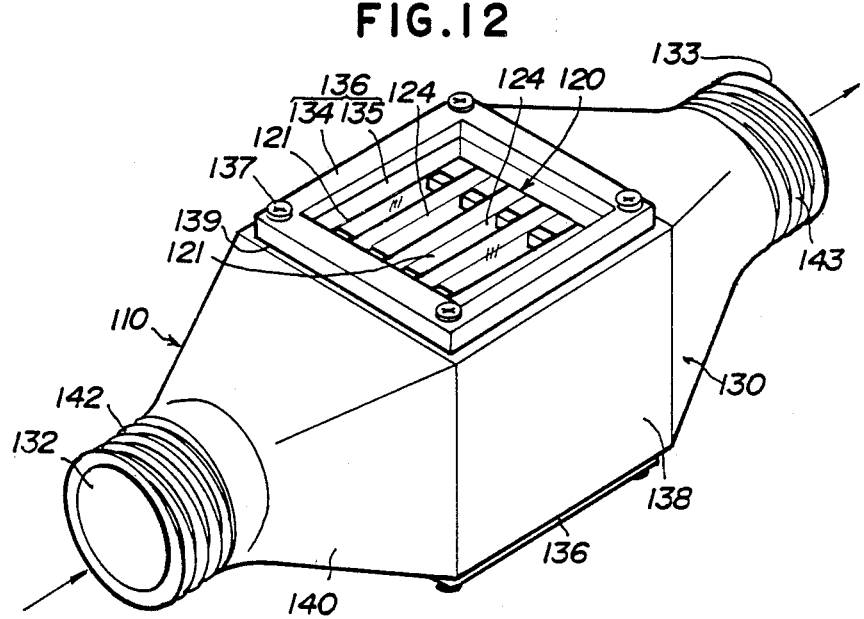
FIG. 12 is an overall perspective view of the magnetic treater of FIG. 11.

In FIGS. 11 and 12, the magnetic treater designated generally at numeral 110 is constructed mainly of a permanent magnet train 120 and a casing 130 in which the permanent magnet train 120 is enclosed.

Figure 13:
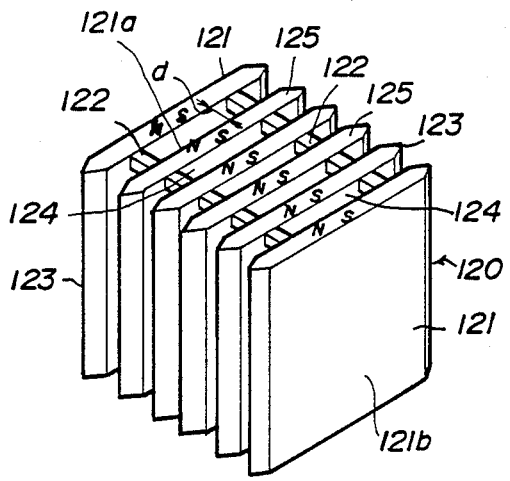
FIG. 13 is a perspective view of a train of permanent magnets in the magnetic treater of FIG. 11.
Figure 14:
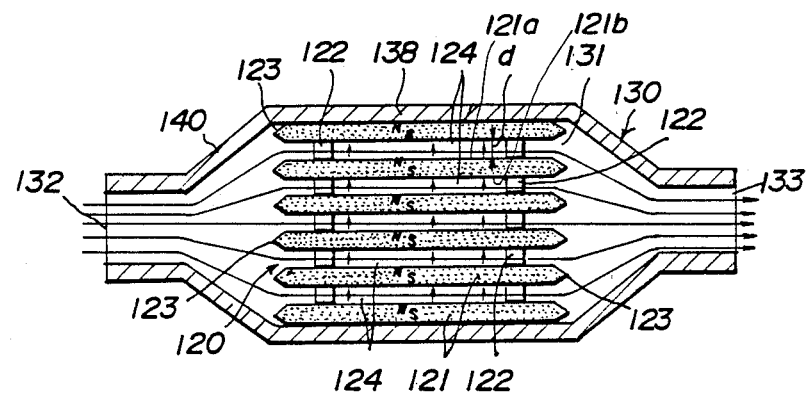
FIG. 14 is a schematic illustration showing the flow of water through the magnetic treater of FIG. 11.
Figure 15:
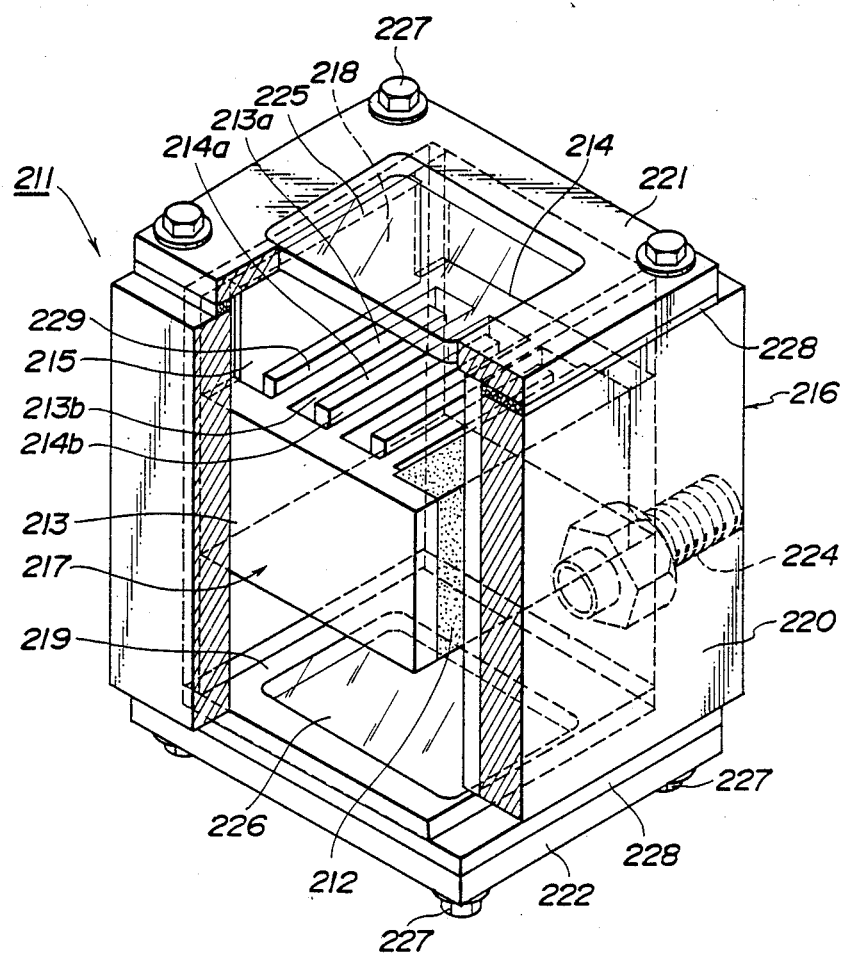
FIG. 15 is a partly cut-away perspective view of a magnetic treater according to a fifth embodiment of this invention.
Figure 16:
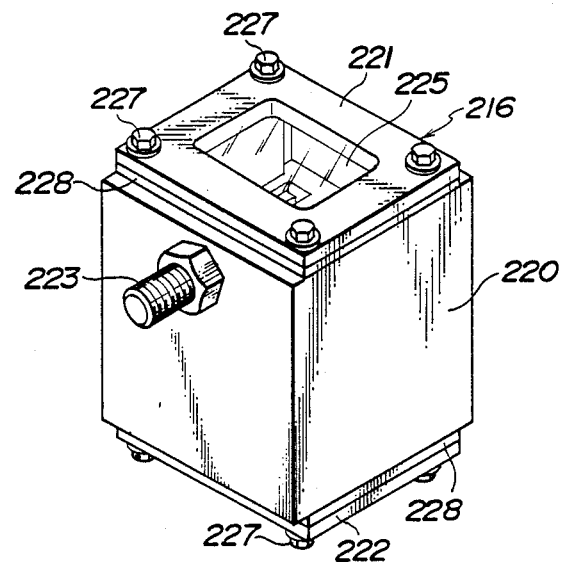
FIG. 16 is an overall perspective view of the magnetic treater of FIG. 15.
Figure 17:
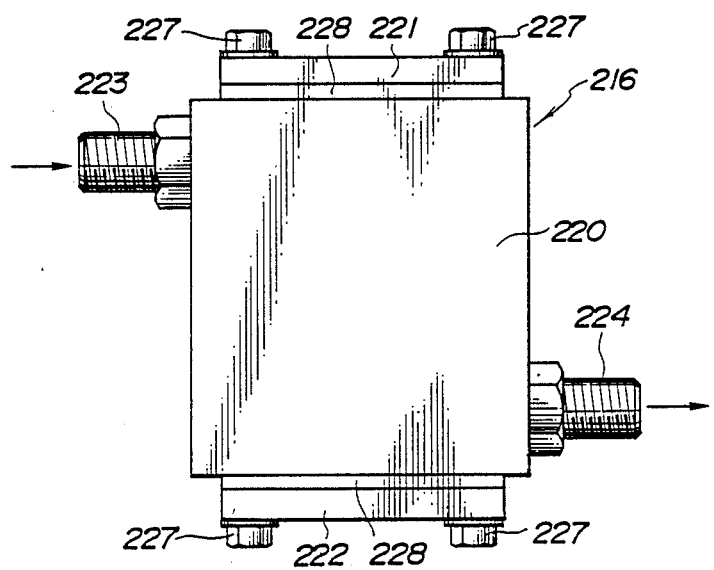
FIG. 17 is a front view of the magnetic treater of FIG. 15.
Figure 18:
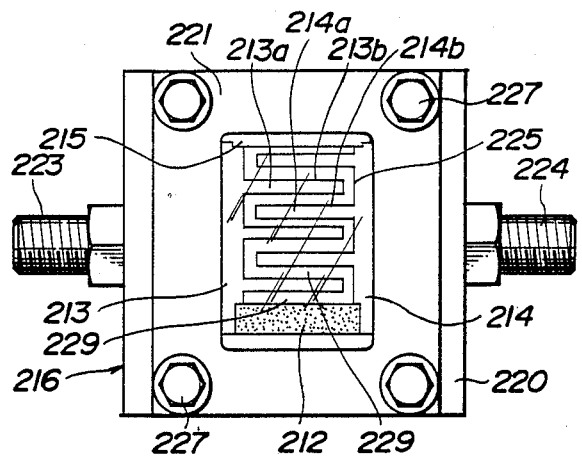
FIG. 18 is a top plan view of the magnetic treater of FIG. 15.

As illustrated in FIG. 13, the permanent magnet train 120 as a magnetically-acting member is formed by providing plural permanent magnets 121 side by side via spacers 122 as interval-limiting means. The spacers 122 are formed of a non-magnetic material. Each permanent magnet 121 has a substantially rectangular plate-like shape, and both sides 121a,126b thereof are magnetized in N and S poles and serve as magnetically-acting surfaces respectively. The permanent magnets 121 are arranged in such a way that their opposing surfaces have opposite polarities and extend substantially parallel with each other. End faces 123,123 of each permanent magnet 121, which are located on the upstream and downstream sides respectively relative to the direction of a flow, are chamfered or tapered to reduce the flow passage resistance.

The length of the spacers 122, namely, the interval d between the adjacent permanent magnets 121 is determined in accordance with the kind of fluid to be treated. This interval d is set narrower when the fluid to be treated is, for example, drinking water or cultivating water, but is set broader where coarse sand particles are contained, as in effluent, sewage water and ready-mixed concrete. It is generally set within a range of from 1 mm to 5 mm. As a result, a flux density of about 3,000–8,000 gauss is obtained with permanent magnets of 10,800 gauss.

The casing 130 is made of a magnetic material, and is equipped with a compartment 131 for the permanent magnet train, said compartment having a rectangular cross-sectional shape, and fluid inlet 132 and fluid outlet 133 which have a circular cross-section and are in communication with the compartment 131. Threads 142,143 are formed in the outer peripheries of the fluid inlet 132 and fluid outlet 133, so that the magnetic treater 110 may be interposed in a piping. On both top and bottom sides of the compartment 131 for the permanent magnet train 120, an inspection window 136 composed of a frame 134 and a glass plate 135 fitted into the frame 134 is detachably provided by bolts 137, so that the interior of the casing 130 can be inspected visually through the glass plate 135.

In the magnetic treater 110 constructed as described above, the length of the spacers 122 is chosen depending on the fluid to be treated. Since the width of the compartment 131 is fixed, the number of permanent magnets arranged side by side is also chosen. The permanent magnet train 120 in which the interval d and the number of permanent magnets have been chosen is inserted into the compartment 131 of the casing 130 through either the top or bottom side of the casing 130 where the corresponding inspection window 136 has been detached. The permanent magnet train 120 is placed in such a way that the individual permanent magnets 121 extend parallel to side walls 138 of the compartment 131 and both outer permanent magnets 121 are maintained in contact with the inner walls of the corresponding side walls 138. As a result, flow passages defined by the spacings between the adjacent permanent magnets 121, namely, magnetically-acting passages 124, extend substantially in parallel to the direction of each flow. It is also designed so that the end faces 123 are positioned near oblique side wall portions 140 of the casing 130. The lengthwise position of the permanent magnet train 120 is limited by the oblique side wall portions, whereby the position of the permanent magnet train 120 does not vary even when a force is applied in the lengthwise direction from the fluid under treatment. After the permanent magnet train 120 has been positioned at a prescribed location as described above, the frame 134 of the inspection window 136 is attached via a packing 139 to the top side of the casing 130 and is then fastened by the bolts 137. As a consequence, the corresponding side faces 125 of the individual permanent magnets 121 are maintained in contact with the inner wall of the glass plate 135 and the fluid is always allowed to pass through the magnetically-acting passages 124 between the adjacent permanent magnets 121. If the pressure of contact between the side faces 125 and the inner wall of the glass plate 135 is too high, it is preferable to interpose a sealing material having high elasticity therebetween.

When the thus-constructed magnetic treater 110 is attached via the threads 142,143 to a fluid passage, and the fluid to be treated, for example, drinking water, is introduced through the fluid inlet 132, the drinking water passes through the magnetically-acting passages 24 defined by the spacings between the adjacent permanent magnets 121. While the fluid passes through there, it is subjected to magnetic treatment and is then discharged through the fluid outlet 133 to predetermined locations where water is used. Accordingly, the fluid is subjected to sufficient magnetic treatment while it flows longitudinally through the magnetically-acting passages 124.

In some instances, the magnetically-acting passages 124 may be clogged with dust contained in the fluid while the fluid flows through the magnetically-acting passages 124. Such clogging can be visually observed through the glass plate 135 of the inspection window 136. If the clogging becomes severe, the magnetically-acting passages 124 can be cleaned with ease by detaching the inspection window 136. Where the size of dust contained in the fluid flowing through the magnetically-acting passages 124 is large, the spacers 122 may be replaced to broaden the width d of the magnetically-acting passages as desired. Optimal magnetic treatment can therefore be chosen in view of the state of the fluid to be treated.

It has empirically been found that the magnetic treater according to the fourth embodiment is effective in promoting the settling of foreign and extraneous materials upon magnetic treatment of sewage water; their settling speed can be accelerated by about 20–30% and the quality of the sewage water can hence be improved in a shorter period of time.

In the fourth embodiment, the inspection window 136 is provided on both top and bottom sides of the casing 130. Needless to say, such an inspection window may be provided on only one of the top or bottom sides of the casing 130. It is however preferable to provide it on both sides for greater ease in inspecting the fluid and magnetically-acting passages 124.

The magnetic treater according to the fourth embodiment of this invention can of course be used for various known magnetic treatments which are effective, for example, in removing red rust and scale, settling and clarifying effluent and sewage water from a garbage incineration plant, improving the strength of concrete, purifying drinking water and promoting the growth and cultivation of plants.

As in the second embodiment, a closed magnetic circuit may also be formed in the fourth embodiment.

As has been described above, the magnetic treater according to the fourth embodiment has brought about various advantages which will be described below.

(1) The magnetically-acting passages 124 of a desired width can be formed by simply replacing the spacers 122. It is hence possible to easily choose an optimal interval d for each fluid to be treated.

(2) The magnetically-acting passages 124 can be positioned substantially in parallel to a flow path and the interval d can also be set broad. Accordingly, the magnetic treater according to the fourth embodiment can be applied even to a fluid which has a high viscosity or contains large particles, without inducing a pressure loss, so that the efficiency of the treatment is high.

(3) The area of magnetic treatment is equal to the product of the area of one side of one of the permanent magnets 121 and the number of the permanent magnets 121 and is hence very wide. The magnetic treatment is performed over the entire length along which the fluid flows, whereby the fluid can be subjected to the magnetic treatment efficiently and in a large volume.

(4) Any clogged parts can be cleaned up by detaching one or both of the inspection windows 136. The maintenance of the magnetic treater according to the fourth embodiment of this invention is therefore easy.

(5) Since a magnetic field is produced by arranging opposite poles in a face-to-face relation, there is substantially no problem of demagnetization, and stable and reliable magnetic treatment is feasible over a long period of time.

[Fifth Embodiment]

In each of the first through fourth embodiments the magnetically-acting member is formed by stacking plural permanent magnets, and flow passages are formed for magnetic treatment by the magnetic pole surfaces of individual permanent magnets (which function as magnetically-acting surfaces), whereby a high flux density is obtained. Such a high flux density may however not be required in some applications. In such cases, it is desirable to use a magnetic treater which is low in cost and enables efficient treatment of a fluid in a large volume. The magnetic treater according to the fifth embodiment of this invention can satisfy such a desire.

In FIGS. 15 through 18, the magnetic treater designated generally at numeral 211 is constructed primarily of a rectangle-like permanent magnet 212 magnetized in N and S poles at both end portions thereof respectively, magnetic pole plates 213,214 having substantially the same width and connected to the N pole and S pole of the permanent magnet 212 respectively, a spacer 215 positioned at one end of the magnetic pole plates 213,214, said end being opposite to the permanent magnet 212 and limiting the interval between the magnetic pole plates 213 and 214, and a casing 216 made of a non-magnetic material and enclosing the permanent magnet 212, magnetic pole plates 213,214 and spacer 215.

Figure 19:
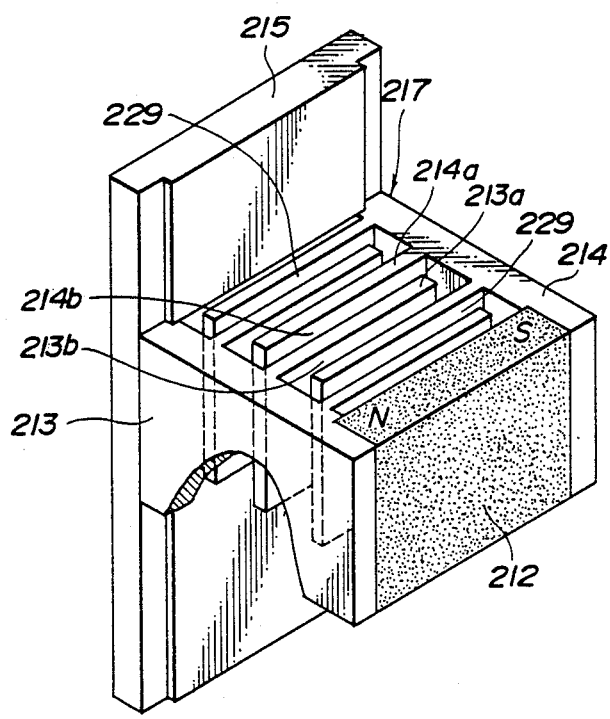
FIG. 19 is a partly cut-away perspective view of a magnetically-acting member enclosed in the magnetic treater of FIG. 15.

The magnetic pole plates 213,214 are formed into a comb-like configuration as shown best in FIG. 19. Individual teeth 213a,214a are staggered at intervals of about 5 mm. Owing to this arrangement, the side surfaces 213b,214b of the individual teeth 213a,213b oppose each other substantially over the entire areas thereof. Therefore, the magnetic pole plate 213 connected to the N pole of the permanent magnet 212 is magnetized into an N pole while the magnetic pole plate 214 connected to the S pole of the permanent magnet 212 is magnetized into an S pole. The teeth 213a,214a are hence magnetized into opposite poles; lines of flux extend from the teeth 213a of the magnetic pole plate 213 on the N pole side to their corresponding teeth 214a of the magnetic pole plate 214 on the S pole side. As a result, the side surfaces 213b,214b of the teeth 213a,214a of the individual magnetic pole plates 213,214 function as magnetically-acting surfaces.

On the other hand, the spacer 215 provided on the side opposite to the permanent magnet 212 is formed of a magnetic material and forms a closed magnetic circuit of the N pole of the permanent magnet 212, the magnetic pole plate 213, the spacer 215, the magnetic pole plate 214 and the S pole of the permanent magnet 212, thereby making up a magnet member 217 which acts as a magnetically-acting member. The spacer 215 also improves the density of the flux from the permanent magnet 212 owing to the formation of the closed magnetic circuit and, in addition, serves to limit the interval between the magnetic pole plates 213 and 214 and the interval of each tooth 213a and its corresponding tooth 214a so as to avoid their mutual contact. Construction of the magnet member 217 in the manner described above can provide a flux density of from 600 gauss to 1,500 gauss between each tooth 213a and its corresponding tooth 214a when the energy product of the permanent magnet 212 is 10,000 gauss. The flux density thus obtained can be set as desired within a certain range by adjusting the interval of the teeth 213a and their corresponding teeth 214a. In the direction of the height in FIGS. 15 and 16, the spacer 215 is formed with a dimension greater than the width (height) of the magnetic pole plates 213,214. At a central part of the spacer 215, the spacer 215 supports the magnetic pole plates 213,214. Accordingly, spaces 218,219 are formed on the sides of the upper and lower edges of the magnetic pole plates 213,214 respectively.

The casing 216 is formed of a rectangular cylinder 220 and top and bottom plates 221,222 closing both top and bottom openings of the rectangular cylinder 220 respectively. As seen in the drawings, an inlet 223 adapted to supply water to be treated is connected as a fluid inlet to an upper portion of the casing 216 and an outlet 224 adapted to discharge treated water is also connected as a fluid outlet to a lower portion of the casing 216. Transparent glass plates 225,226 are provided at central parts of the end plates 221,222 respectively, whereby the inside of the casing 216 can be observed. The end plates 221,222 are attached to the corresponding top and bottom edges of the casing 220 via packings 228 by bolts 227.

When water is supplied to the inlet 223 of the magnetic treater 211 constructed as described above, the water flows into the upper space 218 through the inlet 223 and then flows downwardly along flow passages 229 formed between the adjacent teeth 213a and 214a. The water is magnetically treated in the flow passages 229 between the adjacent teeth 213a and 214a until it flows into the lower space 219. The water thus treated magnetically is discharged through the outlet 224 and is then supplied to one or more intended locations.

Incidentally, the magnetic treater 211 was used for the magnetic treatment of water to be supplied for the growth of a mushroom, *Cortinellus shiitake*. When the water was magnetically treated at a flux density of 600–1,000 gauss, the production of the mushroom increased by 30%–40%.

As has been described above, the magnetic treater according to the fifth embodiment has brought about various advantages which will be described below.

(1) Since the area of magnetization and flux density can be set as desired by the single permanent magnet 212, the magnetic treater is economical and can be applied for a wide range of magnetic treatments.

(2) Magnetic fields are produced by arranging opposite magnetic poles in a face-to-face relation. There is hence no problem of demagnetization. The magnetic treater can therefore show stable performance over a long period of time and its reliability is also high.

(3) The area of the flow passages 229 can be adjusted as desired by changing the interval of the teeth 213a of the magnetic pole plate 213 and their adjacent teeth 214a of the magnetic pole plate 214. The flow passage area is hence not reduced for the magnetic treatment.

(4) Since the area of magnetization is equal to the sum of the areas of the side areas 213b of the teeth 213a, the area of magnetization is wide. The magnetic treatment is performed over the entire widthwise area, along which water flows, whereby the water can be subjected to the magnetic treatment efficiently and in a large volume.

(5) The casing 216 is made of a non-magnetic material. There is hence no leakage of magnetic fluxes, thereby solving the potential problem of any magnetic influence being given to the outside. The magnetic treater can therefore be installed at any desired place.

(6) The magnet unit 217 is constructed of the permanent magnet 212, two magnetic pole plates 213,214 and spacer 215 only. Its assembly is therefore easy.

I claim:

1. A magnetic treater suitable for arrangement in a flow path of a fluid so as to introduce the fluid into a magnetic field to perform a magnetic treatment, comprising:

a magnetic train comprised of a plurality of permanent magnets, said plurality of permanent magnets defining a central through-hole, and each of said plurality of permanent magnets is formed of a plate-like annular member having a magnetized front face and a magnetized back face, said magnetized front face and said magnetized back face being of opposite polarity;

holding means for holding said plurality of permanent magnets side-by-side such that each permanent magnet of said plurality of permanent magnet is separated by a predetermined distance from an adjacent permanent magnet of said plurality of permanent magnets so as to form an open space, said each permanent magnet and said adjacent permanent magnet being arranged so that their opposing surface have opposite polarities, and the central through-hole of each of the permanent magnets defines a first flow passage in addition to the open space between each permanent magnet and adjacent permanent magnet;

a liquid inlet in flow communication with said first flow passage;

a liquid outlet;

a casing provided with the liquid inlet and liquid outlet and enclosing said permanent magnetic train in such a way that a second flow passage is formed between outer peripheral walls of the permanent magnets and an inner wall of the casing to guide the liquid radially and outwardly from the central through-hole of each of the permanent magnets, through the open space and along an associated wall of the permanent magnet to the outer periphery of the permanent magnet and further to the liquid outlet;

a spacing means supporting the train of the permanent magnets on the inner wall of the casing to ensure the formation of the second flow passage; and flow limiting means positioned between said permanent magnetic train and said liquid outlet for preventing the liquid from flowing directly from said first flow passage to said liquid outlet.

2. A magnetic treater as claimed in claim 1, wherein:
said flow limiting means for limiting a flow of the liquid is provided over the central through-hole of the permanent magnet positioned on a side most downstream relative to the direction of the flow of the liquid in the train of the permanent magnets.

3. A magnetic treater as claimed in claim 2, wherein:
the flow limiting means defines at least one orifice which allows the liquid to flow out at a small rate.

4. A magnetic treater as claimed in claim 1, wherein:
outer magnetic poles of the permanent magnets positioned on both ends of the train are short-circuited by a magnetic member.

5. A magnetic treater as claimed in claim 1, wherein:
the individual permanent magnets of the train of the permanent magnets are arranged magnetically independent from each other.

6. A magnetic treater suitable for arrangement in a flow path of a liquid so as to introduce the liquid into a magnetic field to perform a magnetic treatment, comprising:

a train of at least two permanent magnets in the form of a truncated conical cylinder arranged side by side at a predetermined interval via an interval-limiting means to form an open space, each of said permanent magnets having a magnetized inner peripheral surface and a magnetized outer peripheral surface, said magnetized inner peripheral surface and said magnetized outer peripheral surface being of opposite polarity, and each of said permanent magnets defining a central through-hole as a first flow passage;

a liquid inlet in flow communication with said first flow passage;

a liquid outlet; and a casing provided with the liquid inlet and liquid outlet and enclosing said train in such a way that at least the open space between the permanent magnets is in communication with the fluid inlet via said first flow passage and the fluid outlet via a second flow passage.

7. A magnetic treater as claimed in claim 6, further comprising:
holding means for maintaining a predetermined distance between the permanent magnets.

8. A magnetic treater according to claim 7, wherein:
the magnetic field has a flux density of at least 5000 gauss.

9. A magnetic treater as claimed in claim 6, wherein:
the second flow passage for guiding the liquid, which has flowed through the spacing between the permanent magnets, to the liquid outlet is formed between outer peripheral walls of the permanent magnets and an inner wall of the casing.

10. A magnetic treater as claimed in claim 9, wherein:
the second flow passage is formed by a spacing means via which the train of the permanent magnets are supported on the inner wall of the casing.

11. A magnetic treater as claimed in claim 10, wherein:
the spacing means is formed integrally with the interval-limiting means inserted between the permanent magnets.

* * * * *